United States Patent
Brendley et al.

(10) Patent No.: US 11,661,055 B2
(45) Date of Patent: May 30, 2023

(54) CLOSE-IN COLLISION DETECTION COMBINING HIGH SAMPLE RATE NEAR-FIELD SENSORS WITH ADVANCED REAL-TIME PARALLEL PROCESSING TO ACCURATELY DETERMINE IMMINENT THREATS AND LIKELIHOOD OF A COLLISION

(71) Applicant: PreAct Technologies, Inc., Herndon, VA (US)

(72) Inventors: Kurt Brendley, Herndon, VA (US); Keith Brendley, Herndon, VA (US); Jared Bench, Herndon, VA (US); Paul Drysch, Herndon, VA (US)

(73) Assignee: PreAct Technologies, Inc., Herndon, VA (US)

( * ) Notice: Subject to any disclaimer, the term of this patent is extended or adjusted under 35 U.S.C. 154(b) by 158 days.

(21) Appl. No.: 16/883,679

(22) Filed: May 26, 2020

(65) Prior Publication Data
US 2021/0347358 A1     Nov. 11, 2021

Related U.S. Application Data

(60) Provisional application No. 62/852,841, filed on May 24, 2019.

(51) Int. Cl.
*B60W 30/095*     (2012.01)
*B60R 21/013*     (2006.01)
(Continued)

(52) U.S. Cl.
CPC ......... *B60W 30/095* (2013.01); *B60R 21/013* (2013.01); *B60R 21/16* (2013.01); *B60W 10/18* (2013.01); *B60W 10/30* (2013.01)

(58) Field of Classification Search
CPC .... B60W 30/095; B60W 10/18; B60W 10/30; B60R 21/013; B60R 21/16; B60R 21/0134
(Continued)

(56) References Cited

U.S. PATENT DOCUMENTS

| | | | | |
|---|---|---|---|---|
| 6,012,008 A | * | 1/2000 | Scully | G01S 13/931 342/107 |
| 6,405,132 B1 | * | 6/2002 | Breed | G05D 1/0274 701/45 |

(Continued)

FOREIGN PATENT DOCUMENTS

WO    WO-2006052699 A1 *   5/2006       B60R 21/013

OTHER PUBLICATIONS

International Search Report (PCT/ISA/220 & PCT/ISA/210) and Written Opinion (PCT/ISA/237) issued in PCT Application No. PCT/US20/43036 dated Oct. 21, 2020 (20 pages).

*Primary Examiner* — B M M Hannan
(74) *Attorney, Agent, or Firm* — Nixon & Vanderhye P.C.

(57) ABSTRACT

A vehicle safety system performs close-in incipient collision detection that combines high sample rate near-field sensors with advanced real-time processing to accurately determine imminent threats and the likelihood of a collision before a collision occurs. This allows applicable countermeasures to be deployed based upon the probability of a collision, while also taking into account the type of threat and the impending impact's location on the vehicle. This radically new approach will soon transform the passive safety market to greatly reduce injuries from automotive crashes and save lives.

17 Claims, 8 Drawing Sheets

Sense Imminent Collision

Near-filed kinematics approach with ultra high speed vision & unmatched accuracy Detect and Track Threat Object classification, probability engine, predictive analytic done in microseconds Communicate Near Miss or Hit Transmit sensor and telemetry data along with calculated hit and severity predictions to cloud storage (51) Int. Cl.
  *B60W 10/18* (2012.01)
  *B60W 10/30* (2006.01)
  *B60R 21/16* (2006.01)

(58) Field of Classification Search
  USPC .......................................................... 701/45
  See application file for complete search history.

(56) References Cited

U.S. PATENT DOCUMENTS

| | | | | |
|---|---|---|---|---|
| 6,438,475 | B1* | 8/2002 | Gioutsos | B60R 21/01558 180/274 |
| 6,616,186 | B1* | 9/2003 | Midorikawa | B60R 21/01546 280/801.1 |
| 6,658,336 | B2* | 12/2003 | Browne | B60R 21/013 342/72 |
| 7,119,888 | B2* | 10/2006 | Beuschel | G01S 17/58 356/28 |
| 7,909,359 | B2* | 3/2011 | Inoue | B60R 21/207 280/730.2 |
| 8,044,782 | B2* | 10/2011 | Saban | B60N 2/002 340/439 |
| 9,701,307 | B1 | 7/2017 | Newman | |
| 2002/0099485 | A1* | 7/2002 | Browne | G01S 13/87 701/45 |
| 2003/0030583 | A1* | 2/2003 | Finn | B60R 21/013 342/72 |
| 2003/0191568 | A1* | 10/2003 | Breed | B60W 40/06 701/469 |
| 2004/0181338 | A1* | 9/2004 | Dobler | G08G 1/166 701/1 |
| 2005/0060069 | A1* | 3/2005 | Breed | G08G 1/166 701/408 |
| 2005/0114000 | A1 | 5/2005 | Cashier | |
| 2005/0134440 | A1* | 6/2005 | Breed | G01S 17/931 701/45 |
| 2005/0151958 | A1* | 7/2005 | Beuschel | G01S 17/58 356/28 |
| 2005/0195383 | A1* | 9/2005 | Breed | G01S 7/4802 356/28 |
| 2005/0278098 | A1* | 12/2005 | Breed | G01S 7/0235 701/45 |
| 2006/0031015 | A1* | 2/2006 | Paradie | G06T 7/70 340/436 |
| 2006/0247847 | A1* | 11/2006 | Carter | B62B 5/0423 701/498 |
| 2006/0287807 | A1* | 12/2006 | Teffer | G08G 1/07 701/117 |
| 2007/0069920 | A1* | 3/2007 | Hakki | G08G 1/005 340/907 |
| 2007/0109111 | A1* | 5/2007 | Breed | G08G 1/096783 340/435 |
| 2007/0152803 | A1* | 7/2007 | Huang | B60Q 9/008 340/435 |
| 2007/0228704 | A1* | 10/2007 | Cuddihy | B60R 21/0134 280/742 |
| 2008/0046150 | A1* | 2/2008 | Breed | B60R 21/0134 701/45 |
| 2008/0119993 | A1* | 5/2008 | Breed | G01S 13/931 701/45 |
| 2008/0133136 | A1* | 6/2008 | Breed | G05D 1/0274 340/901 |
| 2008/0201042 | A1* | 8/2008 | Cuddihy | B60R 21/0134 701/45 |
| 2009/0192710 | A1 | 7/2009 | Eidehall et al. | |
| 2009/0261561 | A1 | 10/2009 | Huerlin | |
| 2011/0159888 | A1* | 6/2011 | Braiman | G01S 5/0278 455/456.1 |
| 2011/0190972 | A1 | 8/2011 | Timmons | |
| 2011/0295467 | A1* | 12/2011 | Browne | G01S 13/87 701/46 |
| 2013/0054103 | A1 | 2/2013 | Herink | |
| 2013/0082849 | A1* | 4/2013 | Teffer | G06F 16/24 340/905 |
| 2014/0062881 | A1* | 3/2014 | Solomon | G06F 3/0346 345/158 |
| 2015/0283974 | A1* | 10/2015 | Schlittenbauer | B60R 22/02 701/45 |
| 2016/0280134 | A1* | 9/2016 | Miura | G08G 1/04 |
| 2017/0097243 | A1* | 4/2017 | Ricci | B60Q 9/00 |
| 2017/0101093 | A1 | 4/2017 | Barfield, Jr. et al. | |
| 2018/0032042 | A1* | 2/2018 | Turpin | G06V 20/17 |
| 2018/0075309 | A1 | 3/2018 | Sathyanarayana | |
| 2018/0105180 | A1 | 4/2018 | Fung et al. | |
| 2018/0120417 | A1* | 5/2018 | Matsunaga | B60T 8/17558 |
| 2018/0231974 | A1* | 8/2018 | Eggert | G05D 1/0088 |
| 2018/0293449 | A1* | 10/2018 | Sathyanarayana | H04N 5/247 |
| 2019/0001969 | A1* | 1/2019 | Moennich | B60W 30/085 |
| 2019/0077402 | A1* | 3/2019 | Kim | B60W 30/10 |
| 2019/0391582 | A1 | 12/2019 | Jung | |
| 2020/0207358 | A1 | 7/2020 | Katz | |
| 2020/0301438 | A1* | 9/2020 | Zhao | G06V 20/10 |
| 2020/0394915 | A1 | 12/2020 | Salles | |

\* cited by examiner

| | | Light Ring Network 100 | Ring Network 200 | Star Network 300 |
|---|---|---|---|---|
| Feature | PreCrash and Butler Service | Yes | Yes | Yes |
| | ADAS | No | Yes | Yes |
| | AV (L4 & L5) | No | No | Yes |
| Function | Video Output | No | Yes (Limited for 80 fps for 1000BaseT1) | Yes (full frame rate >200fps with 1000BaseT1) |
| | Required Comm | 1x HSCAN (2 I/O) | 1x 1000BaseT1 Ethernet (2 I/O) | 4x 1000BaseT1 Ethernet (8 I/O) |
| | Required Controller Modules | None | ADAD controller with gigabit ethernet connector | PreAct developed controller with 4x gigabit ethernet connection |

FIG. 3

FIG. 4
High Level System Architecture

FIG. 5
Software Block Diagram

CLOSE-IN COLLISION DETECTION COMBINING HIGH SAMPLE RATE NEAR-FIELD SENSORS WITH ADVANCED REAL-TIME PARALLEL PROCESSING TO ACCURATELY DETERMINE IMMINENT THREATS AND LIKELIHOOD OF A COLLISION

CROSS-REFERENCE TO RELATED APPLICATIONS

This application claims priority from U.S. patent application No. 62/852,841 filed May 24, 2019, incorporated herein by reference.

STATEMENT REGARDING FEDERALLY SPONSORED RESEARCH OR DEVELOPMENT

None

BACKGROUND & SUMMARY

Even with all of the safety devices built into vehicles in the United States and many other countries, 11% of the over 41 million accidental injuries reported in the U.S. at emergency rooms are due to traffic incidents. In 2017 alone, over 37,000 people lost their lives due to traffic accidents in the U.S. Most of these fatalities occurred in vehicles with fully operational airbags and where the occupants were using seatbelts. Clearly, existing safety technology, even when properly utilized, is insufficient to protect people from serious injury and even death. There is a long felt but unsolved need to address and overcome these limitations, which every year are costing tens of thousands of lives in the US alone and hundreds of thousands worldwide.

DETAILED DESCRIPTION OF EXAMPLE NON-LIMITING EMBODIMENTS

Example non-limiting technology herein provides an innovative safety technology that identifies an imminent crash before impact and then provides information to rapidly engages preemptive countermeasures that protect the vehicle and its occupants. For example, the example non-limiting technology herein provides a sensor and processing system which can accurately determine if/when a crash is imminent in the vanishingly short time available to act on that knowledge. This allows far more robust and effective safety measures to be employed as opposed to today's technology which typically waits until the collision occurs before taking any action.

An active sensor suite may use high-speed, near-field optics and embedded computing or other example non-limiting high speed sensing, tracking and processing technology. Example non-limiting embodiments herein can determine precisely when and where (e.g., in which direction) a collision is going to occur, buying precious time to respond. With this forewarning, robust countermeasures can have sufficient time to engage. This may include for example external airbags that cushion the blow to pedestrians or protect vehicle occupants from lethal side impacts. Larger and thus far more effective airbags can be employed that both inflate at slower speeds and serve to protect occupants on all sides. The vehicle itself can improve its crashworthiness by adjusting the suspension and internal cab features such as the steering column.

In example non-limiting embodiments, a relevant time window for the technology herein to operate is shortly before an impact—i.e., from a time when the driver of the vehicle can do little to avoid or minimize the impact. Such time window imposes real time and near field constraints that lessens the intent of the driver(s) and reduces the collision problem to more deterministic factors such as Newtonian physics. In some embodiments, rather than avoiding a collision, the vehicle automatically and swiftly prepares for a collision beginning at a time instant so soon before the collision actually occurs that the collision is highly predictable and unavoidable. Such a time window can begin for example at 0.25 seconds (250 milliseconds), 0.2 seconds (200 milliseconds), 0.15 seconds (150 milliseconds), 0.1 seconds (100 milliseconds) or 0.05 seconds (50 milliseconds) before instant of impact. Such short times remove all relevant human behavior, allowing crashes and near misses to be evaluated on purely quantitative terms.

Because deploying countermeasures such as air bags will often have the effect of distracting or hindering the driver from being able to see and/or operate vehicle controls effectively, deploying countermeasures too early could have deleterious effects of (a) preventing the driver from taking evasive action to avoid a collision or minimize its impact and/or (b) deploying a countermeasure before an impact is a certainty (and thus might still be avoidable). However, waiting until an impact is detected (as most modern systems do) wastes precious milliseconds before an imminent crash that could be used to deploy a lifesaving countermeasure.

Example non-limiting technology herein uses highly reliable very fast acting detectors that when combined with the appropriate software statistically have very few false positives within the short time window before a collision (i.e., they can be counted on to reliably detect with a high degree of certainty that a crash is both imminent and unavoidable) to deploy countermeasures such as air bags or other lifesaving techniques.

The example non-limiting technology herein fits well with the ADAS and AV architectures already being considered in the industry and in some cases even fielded across the industry. While these technologies themselves will provide further safety in crash avoidance, vehicle crashes, sadly, are projected to continue increasing globally before eventually declining decades from now. The example non-limiting technology herein holds forth the promise of making the roads safer in the very near future, and by a substantial margin. Deployed worldwide, the technology promises nothing short of a revolution in automotive safety that eclipses even the advances enabled by seatbelts and the current generation of airbags.

While the automotive industry is focused on active safety (e.g. ADAS), little effort is made towards passive safety technology (e.g. seatbelts and airbags). Where ADAS focuses on driver convenience in addition to safety, it accomplishes this by enhancing emergency maneuvers of the vehicle via means such as active braking and lane intrusion warnings. Example non-limiting embodiments herein, on the other hand, focus on safety at the last fraction of a second where no amount of vehicular maneuvers or braking can avoid an imminent collision.

Example non-limiting technology herein provides sensors and system control architectures that are capable of collecting and processing many large quantities of data every second. This allows an extremely accurate countermeasure solution to be fully deployed in just a few milliseconds or less. Example non-limiting technology herein is able to accurately predict the collision of a vehicle with another vehicle or object and then launch one or a suite of countermeasures, such as advanced airbags, to protect occupants in ways heretofore considered impossible.

Example non-limiting embodiments provide a sensing and advanced processing system that can predict an imminent crash with assurance. Adding even 50 milliseconds would roughly double the reaction time. While early simulation experiments indicate that as much as 250 milliseconds of warning of an imminent unavoidable collision is achievable, even a fraction of that would revolutionize the passive safety market. The non-limiting embodiment can also operate up to a second ahead of a crash for selected types of countermeasures and in selected scenarios. With the addition of more time, passive safety systems can do much more to prepare the vehicle for a collision: deploy exterior airbags, adjust the suspension, and inflate larger interior airbags at slower speeds. These combined measures translate directly into reduced injuries and fatalities due to the crash and certainly due to the airbag itself.

Additional example non-limiting features and advantages include:

High Speed—threat tracks leading predictions of collision and severity are developed in a very limited amount of time Near Field—Removes human intent (lateral or in-line) and is based purely on the physics of the objects (e.g., momentum under Newton's laws that cannot change a crash scenario significantly no matter what the human operator or an obstacle such as another vehicle might do or attempt to do)

Fast Real Time Processing—One example embodiment uses massive parallel processing of sensors feeding into distributed FPGAs (field programmable gate arrays) or similar computation capabilities.

Takes the velocity(ies) of objects into account when determining when a collision is imminent or will result in a close call.

Example non-limiting embodiments perform close-in collision detection that combines high sample rate near-field sensors with advanced real-time processing to accurately determine imminent threats and the likelihood of a collision. This allows applicable countermeasures to be deployed based upon the (high) probability of a collision, while also taking into account the type of threat, and the impending impact's location on the passengers of the vehicle. This new approach will soon transform the passive safety market to greatly reduce injuries from automotive crashes and safe lives.

For example:

Suppose one is driving a vehicle moving at 65 mph (30 m/s) and an oncoming vehicle is moving at 65 mph (30 m/s). The combined relative speed is 130 mph (60 m/s).

Let's assume the system needs 100 milliseconds advance notice to deploy the external airbags and other new passive safety features.

Therefore, the vehicle would have to determine an imminent threat when the oncoming vehicle is 6 meters away, about one vehicle length.

Example non-limiting technology herein waits until the last possible moment (or within a time window that includes the last possible moment) to automatically deploy a countermeasure when no human or machine maneuver can change the outcome (e.g., whether or not a crash occurs).

Given the extreme rapidity of the required response, an example non-limiting system may use a sensor which can sample from at least 200 Hz to 500 Hz or faster. In one example non-limiting embodiment, the data from this sensor feeds into a high-speed processor to determine the vehicle trajectory with the accuracy of e.g., 10 to 20 centimeters. From this, the impact point on the vehicle is estimated along with the likelihood of serious collision. The timing and sequence of countermeasures, if any, are calculated and controlled. All of this happens (and needs to happen) in just a few tens of milliseconds in example non-limiting embodiments.

Additional non-limiting features include:

A system comprising: a sensor that senses an object; a processor operatively coupled to the sensor that determines, in response to object sensing, an imminent collision with the sensed object before the collision occurs; and a countermeasure operatively coupled to the processor, the processor controlling the countermeasure to deploy in response to determining the imminent collision.

The sensor may comprise a non-contact sensor.

The processor may determine an imminent collision during a time window within the range of 250 milliseconds, 200 milliseconds, 150 milliseconds, 100 milliseconds, 50 milliseconds and/or 0 milliseconds (this is still useful since it would assist the standard inertial sensors to react more quickly and precisely) before a collision occurs. It may also determine a lower-probability of collision at longer times suitable for some types of countermeasures.

The countermeasure may comprise an air bag, a seat belt tensioner, an external pedestrian air bag, an adjustable seat, an active suspension system or other countermeasure.

The sensor may comprise a time-of-flight sensor, stereoscopic sensor or other.

The sensor may sense parameters relating to the range, xy position, rate of closing and direction of closing of the object.

The sensor may be disposed on a moving object or on a stationary object that tracks the moving object. For example, in one embodiment, the sensor is mounted at a stationary position that is subject to collision with a moving object. The sensor may sense an imminent collision, and deploy a countermeasure(s) (from/on the moving object, from/on the stationary position, or both) to minimize potential damage as a result of the imminent collision.

The processor may track the sensed object as it closes, and output the errors associated with the track The processor may use the track and the errors associated with it to determine the probability of an imminent collision.

In one embodiment, the system includes an actual collision detector, and the countermeasure is deployed in response to the actual collision detector detecting an actual collision.

In an alternative, a system comprises a sensor that senses a closing object; and a processor operatively coupled to the sensor that determines, in response to object sensing, an imminent collision with the sensed object before the collision occurs.

A method comprises sensing an object; determining, in response to object sensing, an incipient collision with the sensed object will occur in 250 milliseconds or less.

The sensing may be performed continually, and the deploying may occur at least in part after the collision occurs.

Example Non-Limiting System

Figure 1:
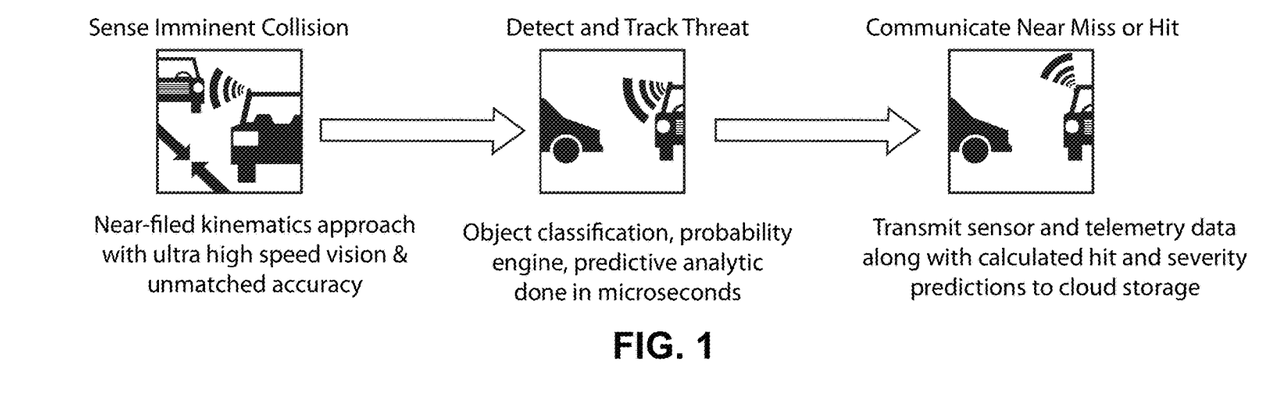
FIG. 1 is a block diagram of an overall process.

Example non-limiting embodiments operate in three stages as shown in FIG. 1. First, the system senses an imminent collision. This is accomplished in one example non-limiting embodiment by using a low-cost, high data-rate time-of-flight (TOF) or other type of fast sensor looking out no farther than for example 20 meters. Such sensing may be performed continually. Several sensors may, for example, be placed around the perimeter of the car housed in headlight and taillight fixtures. Together, the sensors search the scene for elements that are moving relative to the vehicle. These elements are then defined as objects.

Second, the objects are tracked over time. The track is plotted with an error band that allows the probability of an impact to be calculated. In general, the errors tighten as the object approaches or closes. In addition, the size, speed and likely hit location of the object are used to estimate the potential severity of any collision.

In some non-limiting embodiments, the object must meet three criteria to be declared a valid threat:

1. It must be judged as having a sufficiently high severity as to present a threat. For example, a glancing blow to the rear fender would be less likely to be gauged a threat than a head-on collision (at least for protection of the vehicle occupants).
2. The object must have a high likelihood of impacting the vehicle.
3. The object must be large enough to warrant countermeasures to be launched. For example, a short, small box may not pass the threshold, while a much taller, telephone-pole sized object would.

Example non-limiting embodiments may err on the safe side of not launching countermeasures if the determination of an imminent collision is uncertain. For this reason, a normal passive safety system as initiated by the IMU an also remain fully functioning as a back-up safety system to deploy countermeasures when impact is detected. The operations of the IMU will be enhanced by the information available from the track and severity estimations.

Figure 2:
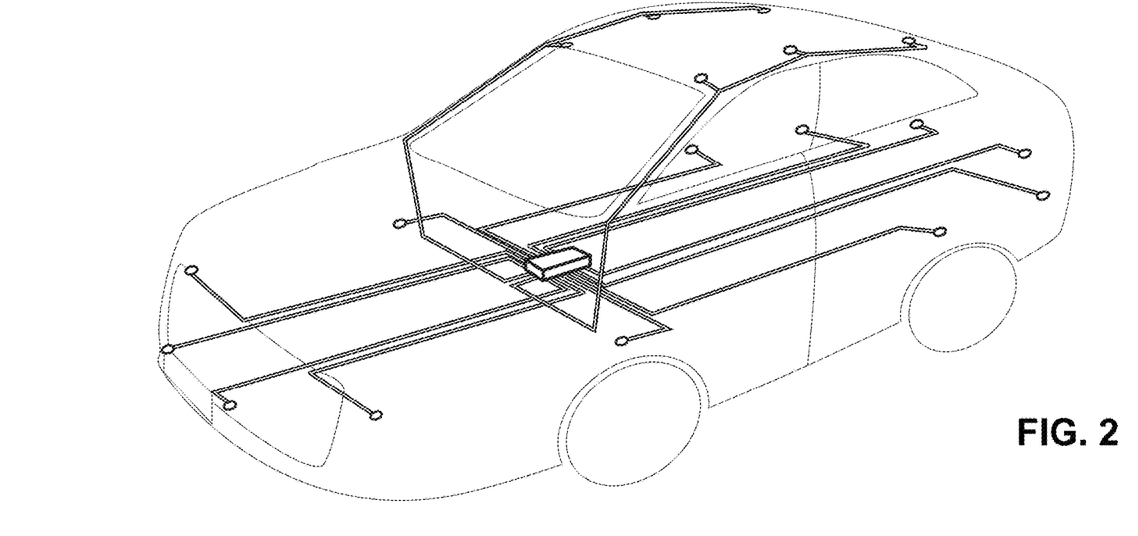
FIG. 2 is a schematic diagram of a vehicle.

FIG. 2 shows is a visual image of an example non-limiting a stand-alone system in a passenger car. It shows the system's ECU taking in and processing the vehicle's sensor feeds. The system can be fully integrated with the vehicle systems including the IMU-based (e.g., accelerometer) airbag and seatbelt tensioner control system.

Figure 3:
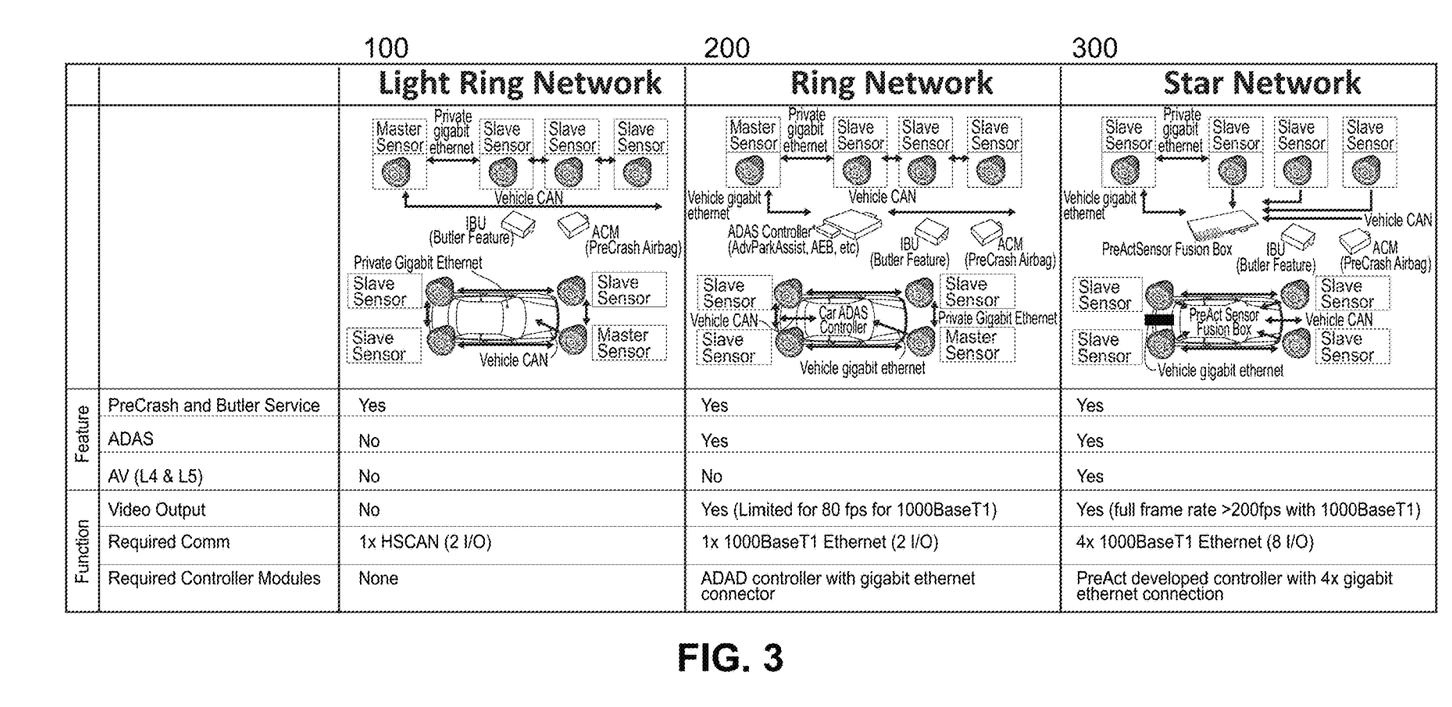
FIG. 3 shows several different hardware architectures for integrating the sensor system into different hardware communication schema.

FIG. 3 shows more detail for example non-limiting hardware integration approaches. In this case, "butler service" refers to features such as gesture recognition or sensing that the car is parked too close to another for safe egress. In 100, the precrash sensors are linked using a private gigabit Ethernet connection. The connection to other vehicle processors and apparatus is via the standard vehicle CAN bus. This supports precrash and butler services, but has insufficient data rate to support most ADAS and AV applications. In 200, the ring network architecture is similar to 100, except that it uses a vehicle-level gigabit Ethernet to send data to ADAS processors. However, there is still insufficient bandwidth to support most AV applications. In 300, the star network uses multiple gigabit ethernet connections to communicate to a central processor, thereby having sufficient bandwith to pass full-frame, high-speed video that is required by many AV applications.

Figure 4:
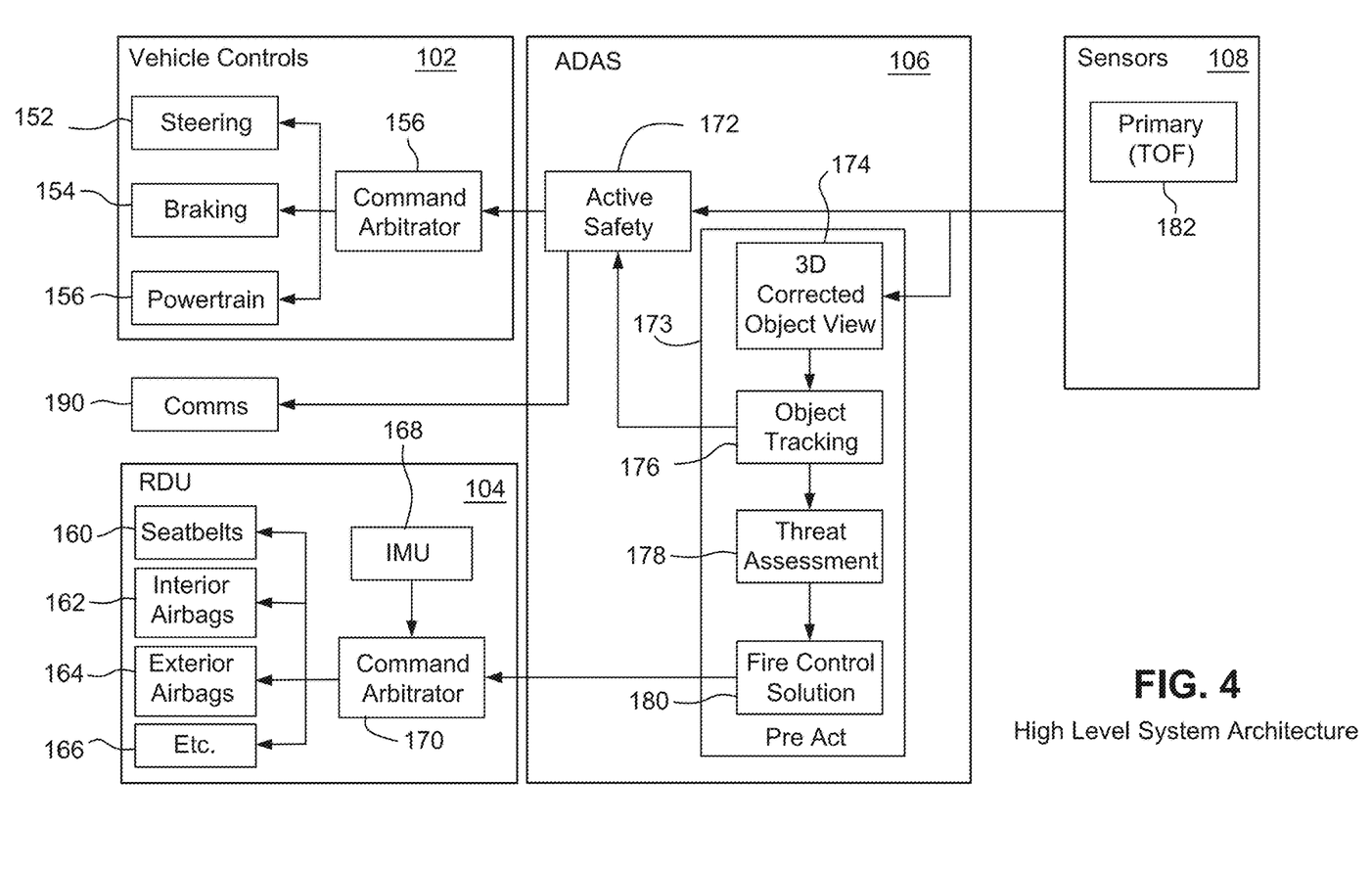
FIG. 4 shows an example block diagram of a non-limiting Edge Cross Correlation Engine (ECCE).

FIG. 4 is a block diagram of an example non-limiting high-level system architecture 100 that includes vehicle controls 102, a countermeasure deployment system 104, an advanced driver assistance system (ADAS) 106 and sensors 108. While the countermeasure deployment system would not be used in near misses, it would be activated in cases where there is an actual collision.

In the example shown, the vehicle controls 102 including steering 152, braking 154, powertrain 156 and command arbitrator 158 may be conventional and the same ones commonly used on any or many modern vehicle(s). The RDU 104 may include a conventional inertial measurement unit (IMU) 168 but in this case its output is provided to a command arbitrator 170 that controls deployment of various countermeasures including seat belt restraining system 160, interior airbags 162, exterior airbags 164 and other countermeasures 166. In the example shown, the seatbelts 160 and interior airbags 162 can be enhanced to accept control from the IMU 168 (indicating a collision has occurred) or via the command arbitrator from ADAS 106 (indicating a collision is imminent but has not yet occurred), and these countermeasures can behave differently depending on which system is actuating their deployment. Additional countermeasures 164, 166 not found on a conventional vehicle (e.g., pedestrian airbag system, bumper shock absorber stiffener, etc.) may be deployed primarily in response to control from ADAS 106 detecting a collision is imminent. For example, one possible countermeasure could include last second chassis actions to mitigate the impact such as e.g., braking only with one brake (e.g., the right front brake or the left front brake, depending on the direction of expected impact) to help pivot the center of gravity to reduce the force of impact.

In the example shown, the ADAS Active Safety block 132 may be enhanced (as described below) and ADAS 106 may be provided with new functionality including a 3D corrected object view block 174, high speed object tracking 176, threat assessment 178 and fire control solution 180. Object tracking 176 is based on the 3D corrected object view 174, which in turn receives input from a sensor such as a very fast time of flight (TOF) or other sensor that can detect shape and direction. Sensor 182 can for example be non-contacting and based on technologies such as optical, electromagnetic, sound-based (e.g., ultrasonic), laser-based, radar-based, or any combination thereof. In one example embodiment, the sensor 182 may be of the type described in US provisional patent application No. 63/030,009 filed on May 26, 2020, and incorporated herein by reference.

The 3D corrected object view 174 is used by threat assessment 178 to assess threat of a likely collision. If threat assessment 178 determines such a threat exists, it records it as a near miss if the threat did not collide and a collision if it does. The threat assessment information is communicated to cloud storage via the communications system 190.

At the core of one example non-limiting solution is an Edge Cross Correlation Engine (ECCE). With ECCE, the example non-limiting system can perform rapid, direct 3D object definitions without the need for complex calibration or resorting to costly artificial intelligence (AI) methods. Once objects are formed, they can be readily tracked, which leads to the prediction of whether or not a collision will occur with its commensurate likelihood.

Figure 5:
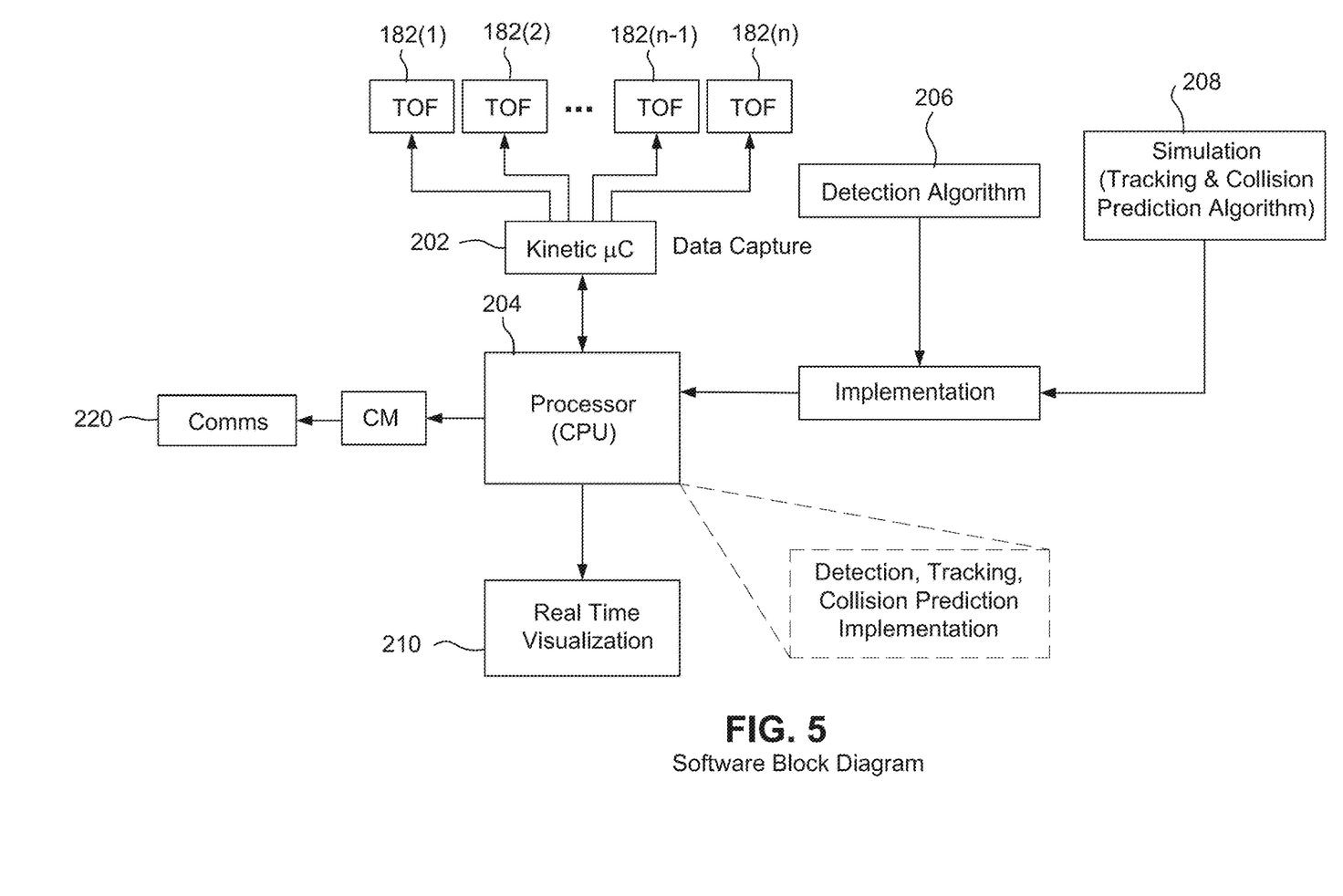
FIG. 5 shows an example block diagram of a non-limiting software architecture supporting precrash operations.

FIG. 5 shows an example non-limiting software block diagram of a software architecture that implements an ECCE described above. This architecture includes a kinetic microcontroller 202 that executes instructions stored in non-volatile memory to very rapidly capture and process data from multiple time-of-flight (TOF) sensors 182. A processor (CPU) 204 implements detection, tracking and collision prediction by performing detection algorithm(s) 206 and processing algorithms based on simulation 208 (which may be used for tracking and collision prediction). The processor 204 may provide real time visualization 210 and output messaging via communications 190 to cloud storage.

Figure 6:
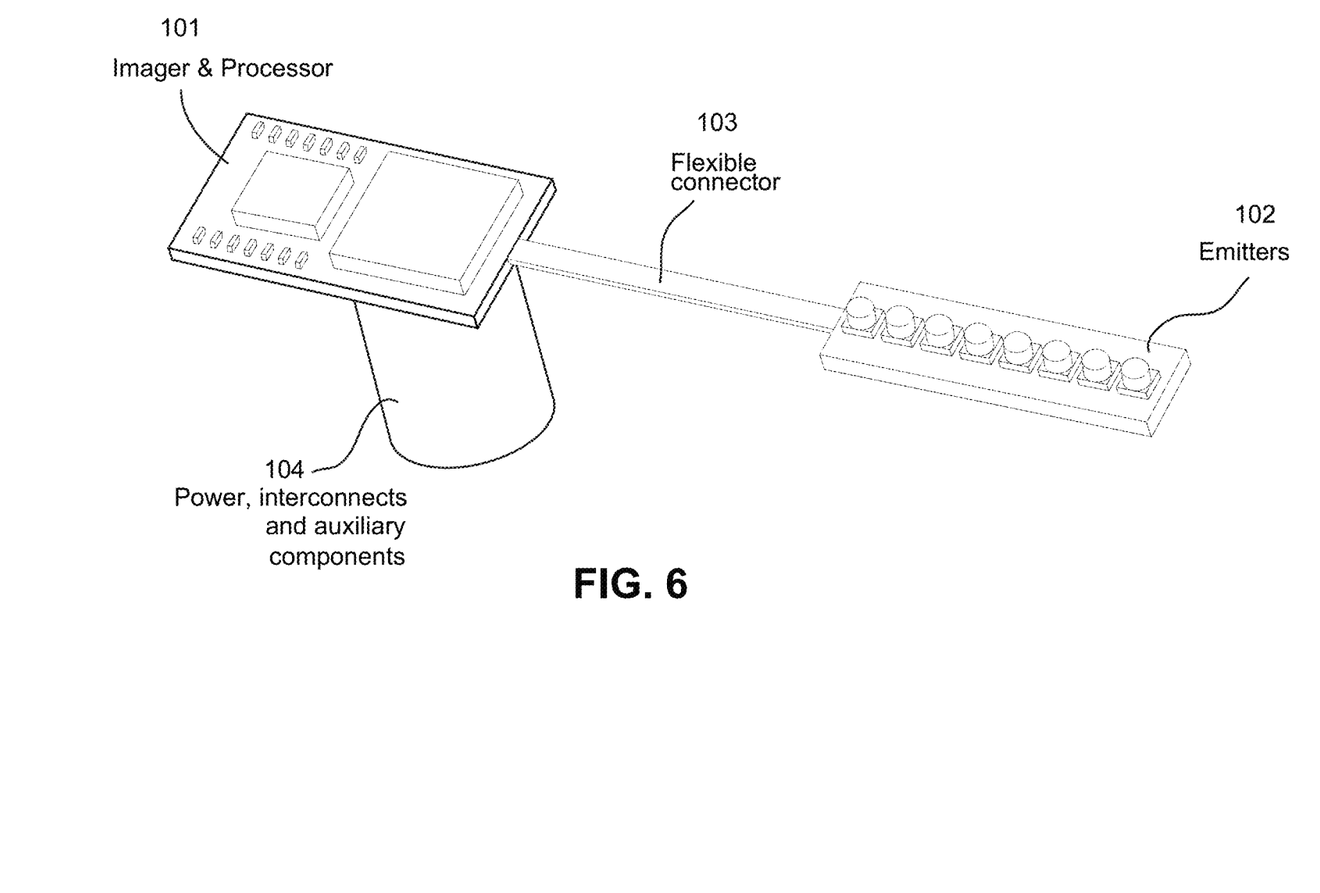
FIG. 6 shows a non-limiting design approach for a time-of-flight (TOF) sensor.

As shown in FIG. 6, one example non-limiting embodiment takes a continuous wave (CW) TOF sensor that has been designed to sample at very high speed (up to 500 samples per second). The 101 imager and processor printed circuit board (PCB) is connected to the 102 emitters via a 103 flexible connector, typically via a gigabit Ethernet protocol. The power, external interconnects and auxiliary components are housed in 104.

Figure 7:
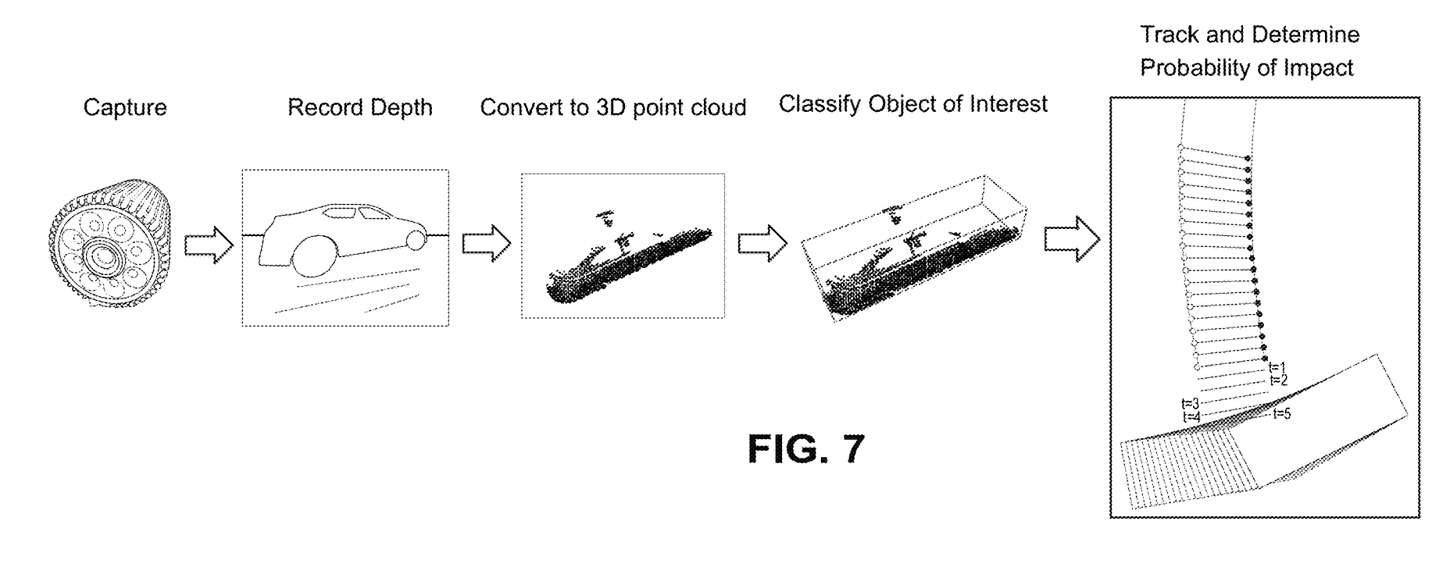
FIG. 7 shows an example of how a TOF sensor builds a point cloud, that is then converted to an object, which is tracked and used to form a probability of impact.

The method that system would operate with is shown in FIG. 7. The sensor with on-board processing captures data, that for a CWTOF sensor is output as a radial depth map. This depth map is converted by the on-board software to a 3D point cloud, which in turn, is classified into an object of interest. The object is then tracked. Tracking typically entails placing each subsequent object frame location into a Kalman filter or similar From this, the track location, velocity vector and even accelerations can be output along with estimates of their error. These values are then run through a "probability engine" to create an estimate of collision probability and a "severity estimator" to estimate the severity of any collision.

Figure 8:
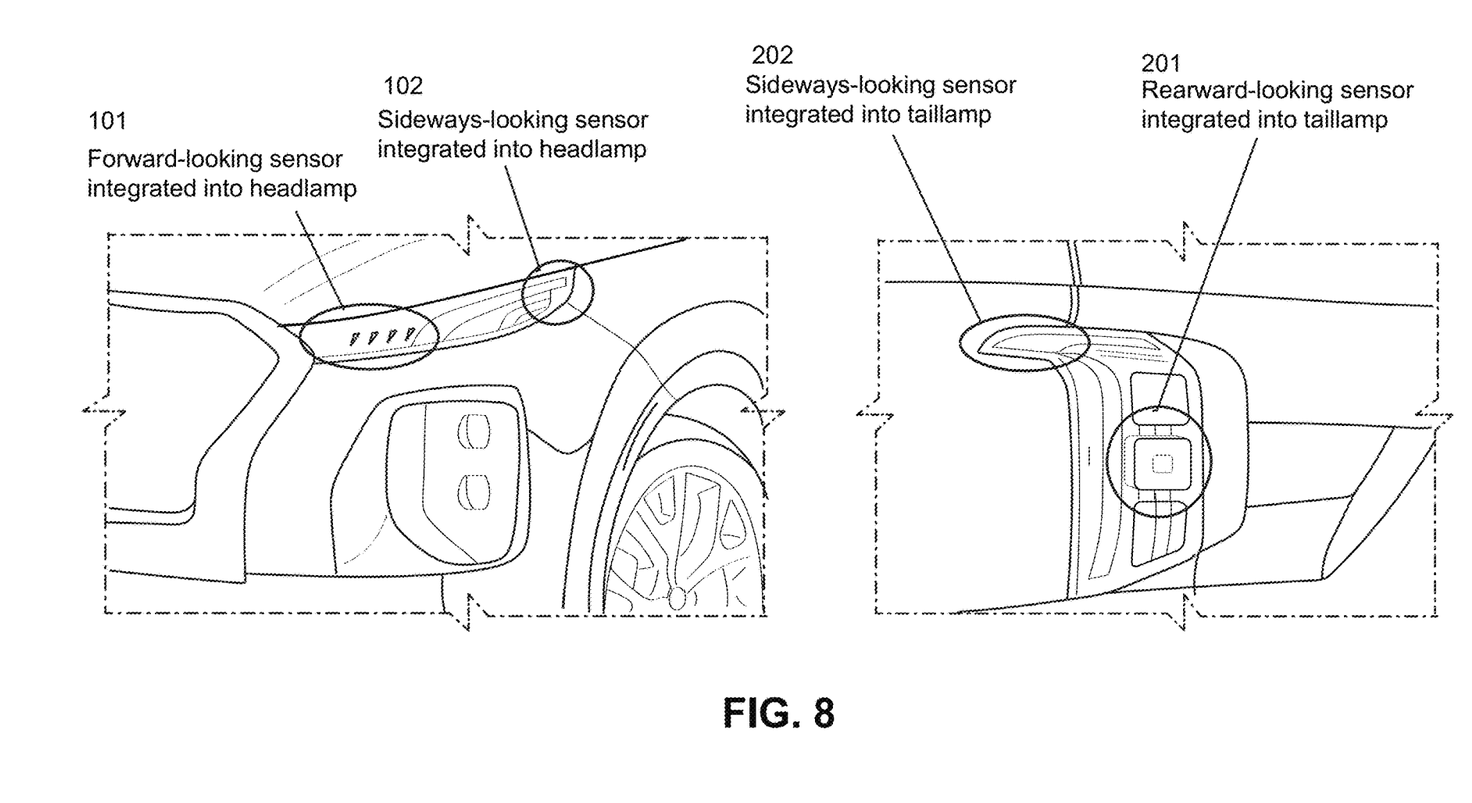
FIG. 8 shows a typical a non-limiting approach for packaging the sensor and edge processing assembly into both headlamps and taillamps.

The system has been designed for ease of packaging onto existing and future vehicles. FIG. 8 shows an example non-limiting embodiment of a packaging scheme that incorporates a CWTOF sensor into the headlamps and taillamps of a vehicle. 101 shows the round sensor to the left of 3 vertical pairs of emitters in a row that is facing forward. 102 shows a sideways looking sensor with an enclosed emitter panel. 201 is a straightforward rearward-looking sensor with 3 emitters above and 3 emitter below. 202 is also in the taillamp but looking sidways with a row of 6 emitters to the left and a single sensor to the right.

Figure 9:
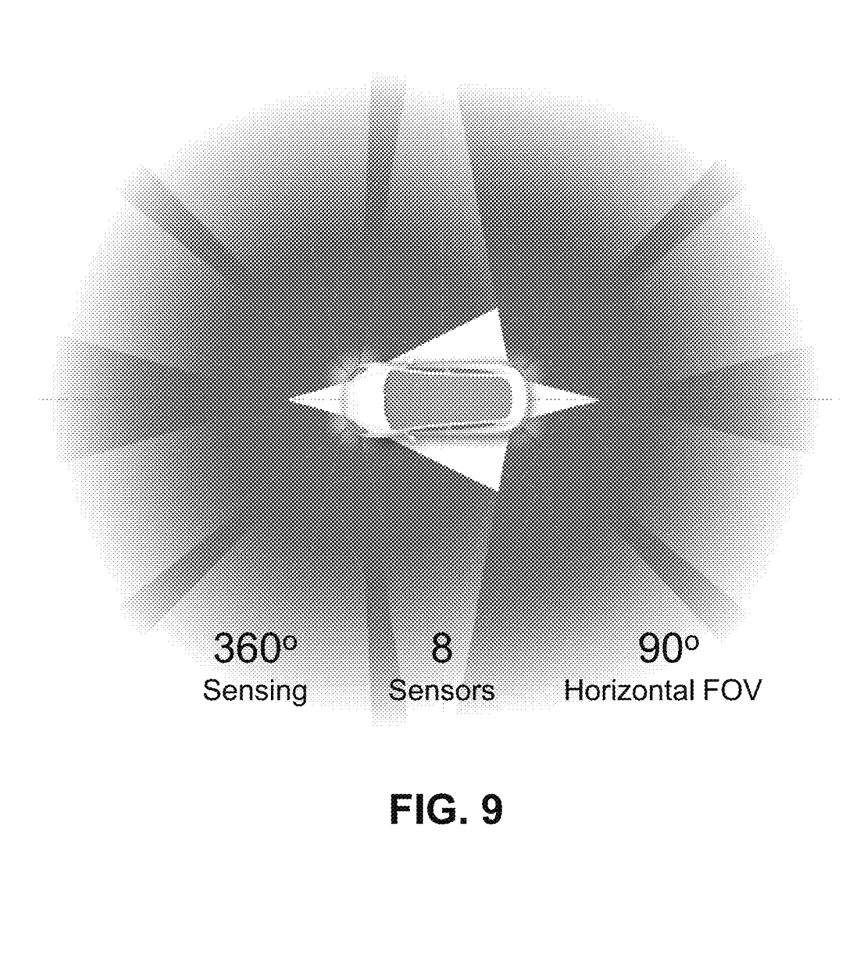
FIG. 9 shows an example non-limiting approach for attaining 360 degree surround coverage.

When configured into the headlamps and taillamps in this manner, the system can provide 360 degree protection as shown in FIG. 9.

The technology herein may be used in any context in which collisions may occur. For example, the sensor(s) may be mounted on a stationary object that is about to the struck by a moving object, or it/they may be mounted on a moving object that is about to strike an stationary object, or it/they may be mounted on a moving object that is about to strike or be struck by a moving object. A countermeasure may be deployed based on tracking information such as the direction of impact, the speed of impact, the force of impact, the time of impact, etc. The countermeasure can be deployed before impact, or it can be prepared for deployment and not employed until the moment of impact or even after the moment of impact. Multiple countermeasures can be deployed, e.g., some countermeasures can be deployed before impact and other countermeasures can be deployed at impact or after impact. Countermeasures can be employed in a "stair stepped" manner, based on severity of expected impact, direction of expected impact, expected force of impact, measured force of actual impact (once impact actually occurs), etc., as the system learns more information about the nature of the impact. Sensing and tracking may be performed continually—not just before impact.

All patents and publications cited herein are incorporated by reference as if expressly set forth.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A system comprising:
   a high sample rate time-of-flight sensor that senses objects in a near field;
   a processor operatively coupled to the sensor configured to:
   track the position of a sensed approaching object as the sensed object closes,
   determining a three-dimensional shape of the object,
   determine error associated with the tracking, and
   in response to the tracking, the determined three-dimensional shape and the determined error, calculate a probability of an imminent collision with the sensed approaching object before any collision occurs and predict severity of the imminent collision; and
   a countermeasure operatively coupled to the processor,
   wherein the processor is further configured to issue a command signal controlling the countermeasure conditioned on the calculated probability and predicted severity of the imminent collision.

2. The system of claim 1 wherein the sensor comprises a non-contact sensor.

3. The system of claim 1 wherein the processor determines an imminent collision during a time window within the range of 250 milliseconds, 200 milliseconds, 150 milliseconds, 100 milliseconds and/or 50 milliseconds before a collision occurs.

4. The system of claim 1 wherein the countermeasure comprises an air bag.

5. The system of claim 1 wherein the sensor senses parameters relating to a range of the sensed closing object, a rate of closing of the sensed closing object, a size of the sensed closing object, and direction of closing of the sensed closing object.

6. The system of claim 1 wherein the sensor is disposed on a moving object.

7. The system of claim 1 wherein the sensor is disposed on a stationary object.

8. The system of claim 1 f wherein the countermeasure is configured to also be deployed in response to a collision detector detecting a collision.

9. The system of claim 1 wherein the processor is further configured to judge whether the imminent unavoidable collision has a sufficiently high severity as to present a threat.

10. The system of claim 1 wherein the processor is further configured to determine, in response to the sensor, whether the object is large enough to warrant deployment of the countermeasure.

11. The system of claim 1 wherein the processor signal is configured to deploy the countermeasure or to prepare the countermeasure for deployment.

12. The system of claim 1 wherein the processor is further configured to command deployment of additional countermeasures in a stair stepped manner, based on severity of expected impact, direction of expected impact, expected force of impact and measured force of actual impact.

13. The system of claim 1 wherein the sensor is configured to output a radial depth map, and the processor is configured to convert the depth map to a 3D point cloud and to classify the 3D point cloud into an object of interest and tracks location and velocity vector with error estimates to create an estimate of collision probability and an estimate of the severity of any collision.

14. A system comprising:
a high sample rate time-of-flight sensor that senses the position and shape of an object closing in a near field; and
a processor operatively coupled to the sensor that tracks the closing object in the near field, determines, in response to object sensing, a probability of an imminent collision with the sensed object, and predicts severity of the imminent collision, before the collision occurs,
wherein the processor is configured to determine error associated with the tracking, and in response to the tracking and the determined error, calculate a probability of an imminent collision with the sensed approaching object during a pre-collision time window at a time shortly before an imminent collision occurs; and
the processor being further configured to selectively activate multiple countermeasures based on the determined probability and predicted severity when the processor determines that a collision event is of sufficiently high probability.

15. A method performed with at least one processor comprising:
sensing an object in a near field with a high sample rate time-of-flight sensor;
tracking the object in the near field;
determining an extent of the object in the near field;
determine error associated with the tracking;
in response to the tracking and the determined error, calculate a probability of an incipient collision with the sensed object will occur in 250 milliseconds or less and predict a severity of the incipient collision; and
deploying a countermeasure in response to determining a high probability that a severe incipient collision will occur in 250 milliseconds or less.

16. The method of claim 15 wherein the sensing is performed continually, and the deploying may occur at least in part after the collision occurs.

17. The method of claim 15 wherein deploying a countermeasure comprises initiating a last second chassis action to mitigate an impact, and braking with only one front brake to pivot a vehicle center of gravity to reduce force of the impact.

* * * * *